(12) United States Patent
Jones, Jr.

(10) Patent No.: US 9,063,212 B2
(45) Date of Patent: Jun. 23, 2015

(54) INDOOR NAVIGATION WITH LOW ENERGY LOCATION BEACONS

(71) Applicant: Edward Forster Jones, Jr., Palo Alto, CA (US)

(72) Inventor: Edward Forster Jones, Jr., Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 129 days.

(21) Appl. No.: 13/764,572

(22) Filed: Feb. 11, 2013

(65) Prior Publication Data
US 2014/0228044 A1 Aug. 14, 2014

(51) Int. Cl.
*H04W 24/00* (2009.01)
*G01S 5/02* (2010.01)
*G01S 1/68* (2006.01)

(52) U.S. Cl.
CPC .......... *G01S 5/0226* (2013.01); *G01S 1/68* (2013.01); *G01S 5/02* (2013.01)

(58) Field of Classification Search
CPC ................................. H04W 4/02; H04W 4/00
USPC ............ 455/434, 456.1, 419, 450, 427, 406, 455/404.2, 456.6, 456.5, 411; 342/34, 36, 342/423, 415; 340/10.1, 3.32, 4.2; 370/338; 701/410, 472, 500, 475; 707/769
See application file for complete search history.

(56) References Cited

U.S. PATENT DOCUMENTS

| | | | |
|---|---|---|---|
| 5,774,829 A * | 6/1998 | Cisneros et al. | 701/475 |
| 5,936,572 A | 8/1999 | Loomis | |
| 6,944,542 B1 | 9/2005 | Eschenbach | |
| 7,242,303 B2 | 7/2007 | Patel | |
| 7,379,015 B2 | 5/2008 | Workman | |
| 7,397,381 B2 | 7/2008 | Dipiazza | |
| 7,403,853 B1 | 7/2008 | Janky | |
| 7,772,976 B2 | 8/2010 | Christopher | |
| 2004/0203904 A1* | 10/2004 | Gwon et al. | 455/456.1 |
| 2004/0264425 A1* | 12/2004 | Nishikawa | 370/338 |
| 2007/0293229 A1* | 12/2007 | Khan | 455/450 |
| 2010/0066503 A1* | 3/2010 | Rhie et al. | 340/10.1 |
| 2011/0045840 A1* | 2/2011 | Alizadeh-Shabdiz et al. | 455/456.1 |
| 2011/0282901 A1* | 11/2011 | Marks et al. | 707/769 |
| 2012/0182180 A1* | 7/2012 | Wolf et al. | 342/357.29 |
| 2013/0065584 A1* | 3/2013 | Lyon et al. | 455/434 |
| 2013/0225197 A1* | 8/2013 | McGregor et al. | 455/456.1 |

* cited by examiner

*Primary Examiner* — Kiet Doan
(74) *Attorney, Agent, or Firm* — NUPAT, LLC; Morrison Ulman

(57) ABSTRACT

Low energy location beacons provide a robust indoor navigation solution that is potentially accessible to anyone with a cell phone.

21 Claims, 9 Drawing Sheets

INDOOR NAVIGATION WITH LOW ENERGY LOCATION BEACONS

TECHNICAL FIELD

The disclosure is generally related to indoor navigation.

BACKGROUND

The NAVSTAR global positioning system (GPS) and other global navigational satellite systems (GNSS) provide accurate and reliable navigation signals around the globe. GPS receivers work well whenever a clear view of the sky is available. Indoors or near obstructions, however, GPS receivers may be limited by weak signals, reflections and multipath interference. Thus alternative or supplementary navigation systems are needed for indoor use.

Domed stadiums, shopping malls and warehouses all provide examples of situations in which indoor navigation systems may be helpful to people trying to find their way. An indoor navigation system based on radio frequency identification (RFID) tags was disclosed in "Reverse RFID location system" by G. Best et al., U.S. Ser. No. 12/544,869 filed on 20 Aug. 2009. In a reverse RFID (R-RFID) navigation system a set of RFID tags are placed in known locations, e.g. distributed inside a building. Each RFID tag stores its position. A user of the R-RFID system estimates his position based on the positions reported by nearby RFID tags. For example a user may be located such that his RFID tag reader can interrogate three nearby RFID tags. The user may estimate his position as the average of the three reported positions.

R-RFID techniques are a promising new indoor navigation solution. However, RFID readers are specialized devices; not everyone has one. What is needed is an indoor navigation system that almost anyone can use.

DETAILED DESCRIPTION

Indoor navigation with low energy location beacons is based on standardized radio communications protocols such as 2.4 GHz Bluetooth Low Energy (BLE). BLE provides for low duty cycle (i.e. <1%) transmissions so that average power consumption is low. A BLE transmitter may run for a year or more on a button battery.

There will soon be more cell phones than people on earth. About a billion new cell phones that include BLE-compatible radio chips are manufactured each year. Since a cell phone may be used as a navigation receiver for an indoor navigation system based on low energy location beacons, anyone with a cell phone will be able to navigate indoors.

Low energy location beacons are fixed in known positions. For example, a beacon may be fixed at (−2440, 8675, 4896) in a local (x, y, z) coordinate system. Each beacon broadcasts its position from time to time. The beacon located at (−2440, 8675, 4896) broadcasts a message specifying that location. Beacons broadcast their positions expressed in local coordinates and also the relationship between the local coordinate system and a geocoordinate system such as latitude, longitude, altitude or universal transverse Mercator (UTM) grid plus altitude coordinates. For example a beacon may transmit its local coordinates and the location of the origin of the local coordinate system as expressed in geocoordinates. The message may be encrypted to restrict access to beacon position data.

A receiver, such as a BLE-compatible cell phone, listens to position broadcasts from any location beacons that it can hear. In the case of BLE, the range of location beacons is about 50 meters or less. The receiver estimates its position based on positions of beacons. For example, if the receiver hears three beacons broadcasting (−2440, 8675, 4896), (−2456, 8654, 4895) and (−2431, 8661, 4892) respectively, the receiver may average those positions to estimate its own position as (−2442.33, 8663.33, 4894.33). Methods for estimating receiver position based on beacon positions are described in more detail below.

A person using a cell phone to navigate indoors using low energy location beacons need not reveal his estimated location to any third party. The receiver does not need to be connected to a network. Of course, if a person is willing to reveal his location, network services may be provided such as enhanced maps and navigation suggestions.

Low energy location beacons are inexpensive. A million-square-foot building may be equipped with them for only a few thousand dollars. The density of beacons required depends on the desired level of position accuracy and update speed, among other factors. It is possible that not all beacons within range of a receiver are heard within a desired position update time because low energy beacons operate at low duty cycle.

Figure 1:
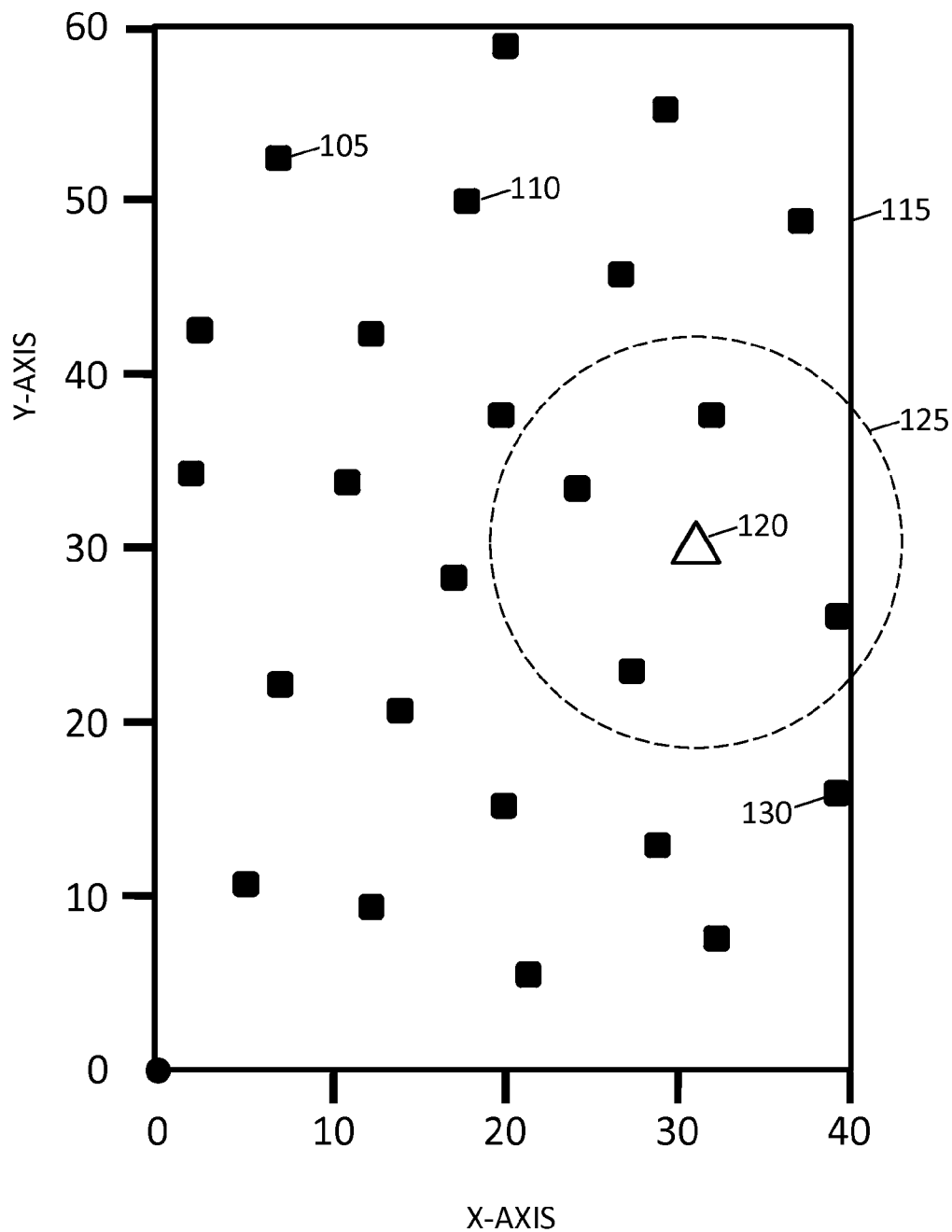
FIG. 1 shows an example layout of low energy location beacons in a building.

FIG. 1 shows an example layout of low energy location beacons in a building. The location of each tag may be expressed in a fixed, local coordinate system such as that defined by the X and Y axes shown in the figure. In FIG. 1, low energy location beacons such as beacons 105 and 110 are fixed in an indoor space 115. The position of a receiver, as estimated by the receiver based on received beacon positions, is indicated by triangle 120. Dashed circle 125 indicates the approximate range of a low energy location beacon. A beacon located outside circle 125 likely will not be heard by a receiver located at triangle 120. Beacons located at the edge of a room, e.g. on a wall, such as beacon 130 present a special case discussed below. The location of the origin (0, 0) of the local coordinate system, expressed in geocoordinates, is part of the position message sent by each beacon.

Even though four beacons are shown within range of estimated position 120, a receiver located there may not hear all of them within a short time. A receiver that updates its position estimate every second, for example, relies primarily on information received during the previous second. Low energy beacons broadcast with low duty cycles which may lead to intervals of more than one second between broadcasts. Beacons may be designed to transmit with lower duty cycles that reduce power consumption or higher duty cycles to provide faster position updates. A duty cycle less than 1% may permit battery operation for more than one year, for example.

Figure 2:
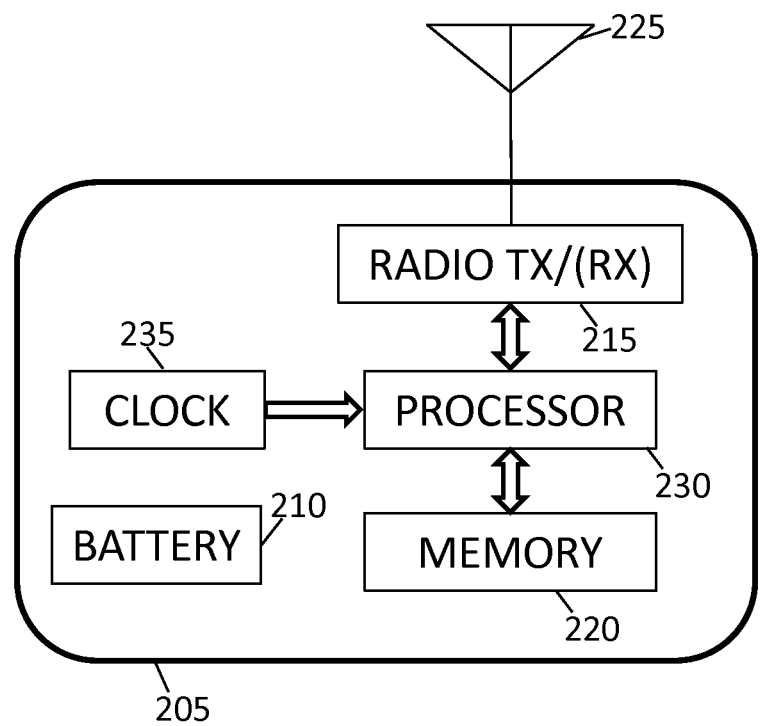
FIG. 2 is a conceptual block diagram of a low energy location beacon.

FIG. 2 is a conceptual block diagram of a low energy location beacon. Beacon 205 includes optional battery 210. Radio 215 is connected to antenna 225. Radio 215 may include a transmitter or a transmitter/receiver. Radio chip 215 may also include a modem, frequency synthesizer and balun. Radio 215 communicates with processor 230 which in turn communicates with clock 235 and memory 220. Clock 235 may include a crystal oscillator. Memory 220 may include random access memory (RAM), read-only memory (ROM) and boot ROM for the processor. The memory includes non-transitory, computer readable media such as ROM in which processor instructions are stored.

Processor 230 reads the position of the beacon from memory 220 and broadcasts the position using radio 215. Instructions for the timing and content of position broadcasts may be stored in ROM. If the low energy beacon is a BLE beacon, the position broadcast may use the BLE advertising protocol on advertising channels at 2402, 2426 and 2480 MHz. Data in the position broadcast may be encrypted to restrict access to beacon position information.

A basic beacon may transmit at one power level or at a maximum power level determined by the amount of remaining battery power. A more advanced beacon may transmit at several different power levels and indicate the transmitted power level as part of its broadcast message.

Low energy location beacons that use the BLE protocol operate in the 2.4 GHz band. BLE and similar protocols, and location beacons using them, may also operate in other bands such as the 5.2 GHz band. Beacons may recharge their batteries if they are equipped with photovoltaic cells. As an alternative to batteries a beacon may store electrical energy in a capacitor. Batteries, capacitors or other electrical energy storage units may be recharged from, or replaced by, a connection to an external power source such as building mains power.

Low energy location beacons are short range, low power consumption devices. For example a beacon may generate a radio frequency signal between −20 and +10 dBm while transmitting a broadcast. (Preferably a beacon outputs a 0 dBm or less RF signal while transmitting.) These power levels lead to an effective beacon range of approximately 5 to 50 meters.

Figure 3:
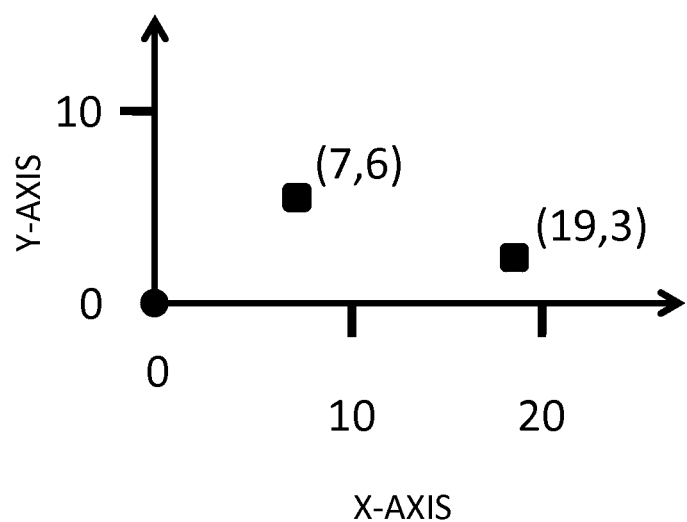
FIG. 3 illustrates low energy location beacon position coordinates.

FIG. 3 illustrates low energy location beacon position coordinates. In FIG. 3 beacons are illustrated at (X, Y)=(7, 6) and (X, Y)=(19, 3). For simplicity only two dimensions are shown but three dimensional coordinates may be used in practice. The coordinate system may conveniently be expressed in terms of offsets from a known reference point such as the corner of a building. The location of the known reference point, as expressed in geocoordinates, is part of the beacons' position broadcast.

In some situations it may be useful for a position beacon to report a false position. Consider, for example, beacons located on a wall such as beacon 130 of FIG. 1. Suppose that the X axis of FIG. 3 represents a wall such that no receiver navigating indoors could ever find itself at a position with a negative Y coordinate. In that case a beacon located on the wall, e.g. (15, 0) might report a false position, e.g. (15, −2). False position reports can improve receiver position estimates at boundaries when a receiver averages received beacon positions.

Figure 4:
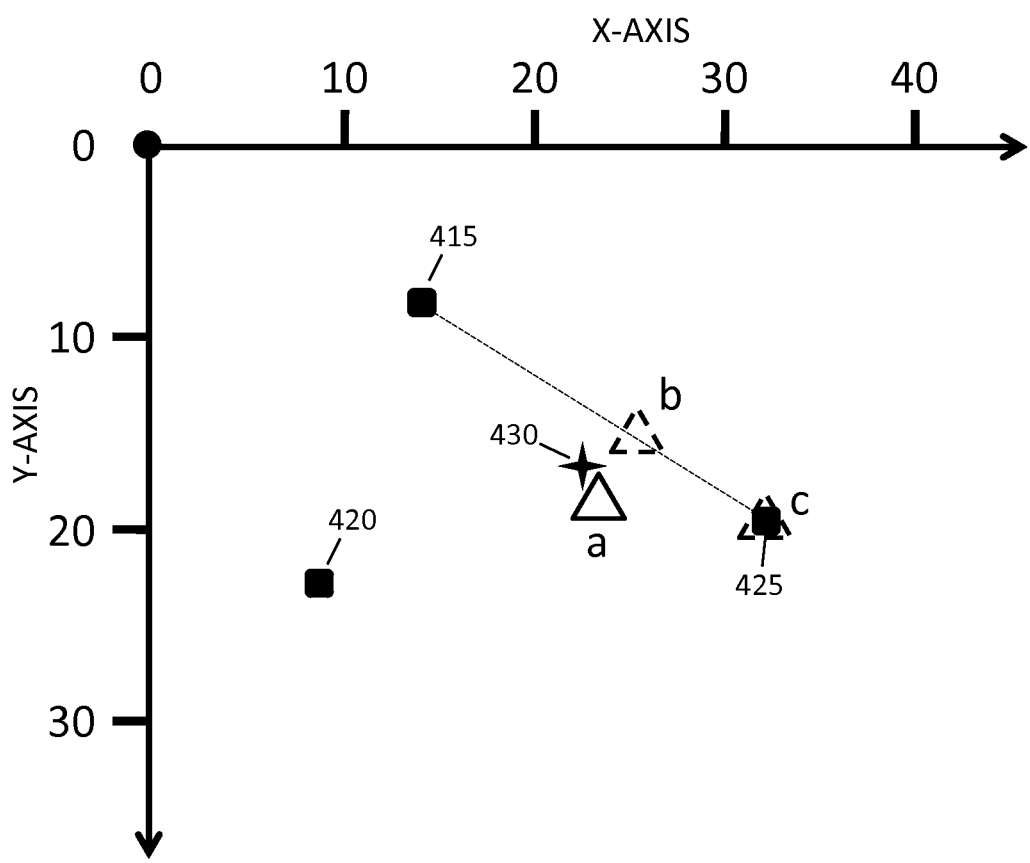
FIG. 4 illustrates positioning methods using low energy location beacons.

FIG. 4 illustrates positioning methods using low energy location beacons. In FIG. 4, X and Y axes define a local coordinate system in which beacons 415, 420 and 425 are located. The positions of a receiver as estimated using different navigation techniques are represented by triangles "a", "b" and "c". The true position of the receiver is marked by four-point star 430.

The simplest and crudest position estimate is obtained by assuming that the position of the receiver is the same as that of a nearby beacon. Although this estimate almost never gives the correct receiver position (i.e. true position 430), it is often useful—"good enough" for many applications. In FIG. 4 such an estimate is represented by triangle "c" which is superimposed on the location of beacon 425.

A better position estimate is obtained when a receiver can determine that its location lies on a line between two tags. In FIG. 4 such an estimate is represented by triangle "b" which lies on a straight line connecting tags 315 and 325. The receiver's position along such a line, i.e. how far it is from each end, may be estimated by measuring received signal strength from each beacon.

Triangle "a" represents a still better estimate of reader position that lies between tags 415, 420 and 425. Although FIG. 4 shows only two dimensions, X and Y, position estimates between beacons, such as triangle "a", may be obtained in three dimensions and may rely on position broadcasts from three or more beacons. When four beacons signals are available, three-dimensional positioning is more robust if the beacons do not all lie in the same plane.

Figure 5:
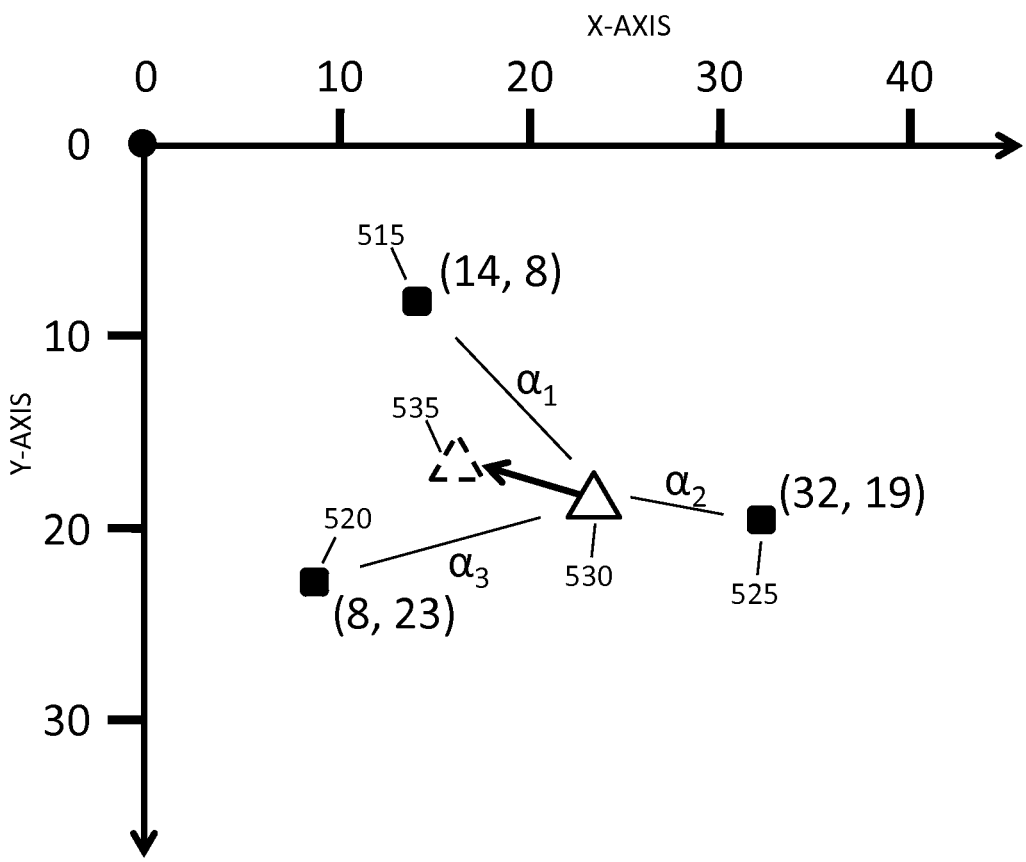
FIG. 5 illustrates positioning methods using low energy location beacons.

FIG. 5 illustrates positioning methods using low energy location beacons. In FIG. 5, X and Y axes define a local coordinate system in which beacons 515, 520 and 525 are located at positions (14, 8), (8, 23) and (32, 19) respectively. Triangles 530 and 535 represent position estimates for a receiver. Position estimate 530 is estimated by a receiver from a weighted average of positions of nearby beacons. Transmitted or received signal strength, or a function of one or both of them, determines the weighting factors which are normalized before being applied to beacon positions.

In this example, weighting factor $\alpha_1$ is applied to the position of beacon 515 while factors $\alpha_2$ and $\alpha_3$ are applied to the positions of beacons 520 and 525 respectively. For example, a receiver at position 530 might determine that $\{\alpha_1, \alpha_2, \alpha_3\}=\{0.285, 0.453, 0.262\}$. The receiver's estimated position is then $\{\alpha_1(14, 8)+\alpha_2(32, 19)+\alpha_3(8, 23)\}=(21, 17)$ where the receiver obtained the position of each beacon from the beacons' broadcasts. This simple method of averaging beacon positions to find receiver position is robust, simple and reasonably accurate.

A receiver's speed and direction of travel may be estimated from successive position fixes. For example, if a receiver moves from position 530 to position 535 in FIG. 5, its speed may be estimated by dividing the distance between estimated positions y the time taken to travel from one to the next.

Figure 6:
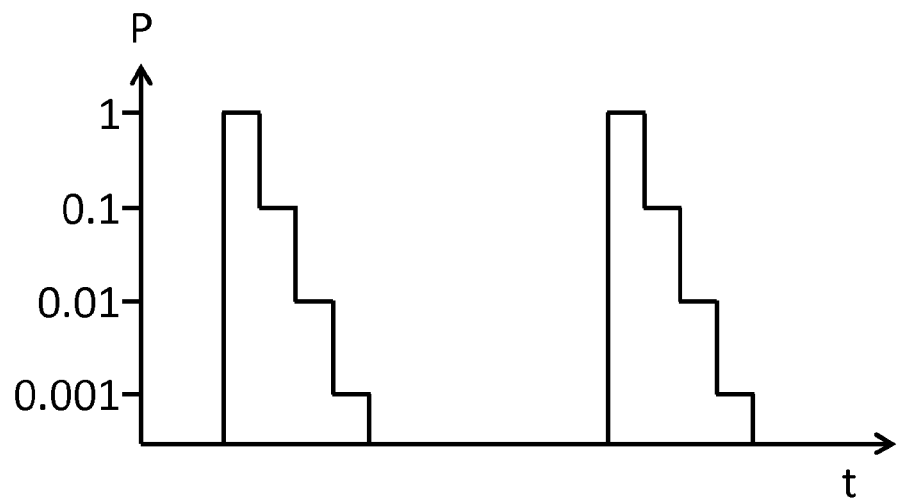
FIG. 6 illustrates low energy location beacon signal variable power levels.

FIG. 6 illustrates low energy location beacon signal variable power levels. FIG. 6 shows a graph of relative power output, P, from a beacon versus time, t. The power axis is logarithmic. The beacon transmits at full power (1) and reduced power levels (0.1, 0.01 and 0.001) at various times. An actual time sequence of transmitted power levels may be other than that illustrated in the figure.

Beacons that transmit at different power levels allow a receiver to rely on signals from closer beacons in preference to those farther away. Estimates of receiver position based on nearby beacon positions are often more accurate that those based on distant beacon positions. Receivers learn beacons' transmit power levels if that is part of the beacons' transmitted message along with beacon position. To ensure that nearby beacon positions are used in a receiver's position estimate, a receiver uses positions reported by beacons transmitting at low power levels in preference to positions reported by those transmitting at high power levels. Positions included in a low power beacon broadcast may be weighted more heavily in a position averaging scheme, for example. A receiver may also use variable receiver gain to control the number of beacon broadcasts received.

Transmitting some position broadcasts at less than maximum power also saves beacon battery life. Even more power would be saved if beacons always transmitted using less than full power. However, it is not always easy to predict beacon signal propagation characteristics in advance. Signals may be temporarily blocked, for example, or receiver sensitivity may vary. Thus, variable power level beacons may increase the reliability of low energy location beacon indoor navigation systems.

Figure 7:
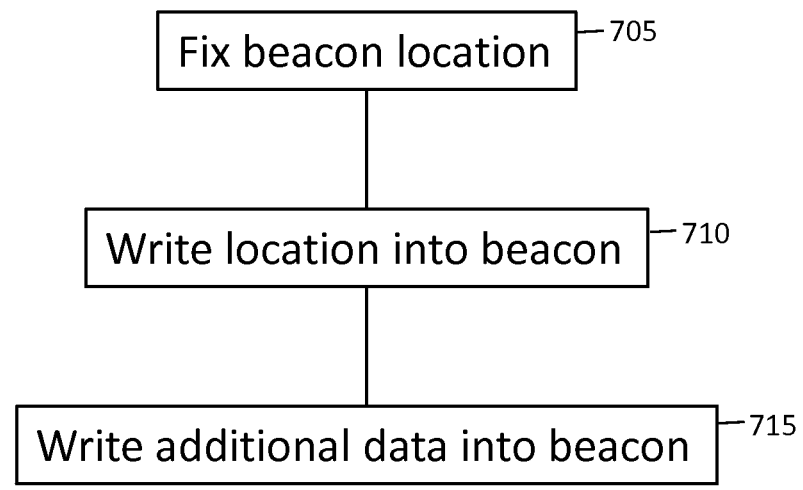
FIG. 7 is a flow chart for a low energy location beacon deployment method.

Deploying a set of low energy location beacons for indoor navigation is simple and inexpensive. FIG. 7 is a flow chart for a low energy location beacon deployment method. Step 705 is fix beacon location; step 710 is write location into beacon; and step 715 is write additional data into beacon. The steps shown in FIG. 7 may be performed in any order and step 715 is optional.

As an example of beacon deployment, a beacon is first fixed in a known location. For example a beacon may be fixed to a light fixture in a ceiling. A programming tool is then used to load the beacon's location into its memory. If the beacon includes a radio receiver, this operation may be performed wirelessly. This procedure is repeated with each beacon until a desired coverage area is equipped with beacons at a desired density. Locations may be written into beacon memory before the beacons are fixed in place, but errors in beacon placement may subsequently occur.

Examples of additional data that may be stored in a beacon's memory and made part of a beacon's broadcast message include: description of a building, room, department or aisle; safety or hazard information; access requirements; and, an envelope of a local coordinate system (maximum and minimum values of X, Y and Z) which may be used by a receiver to determine whether it is inside or outside a structure.

Figure 8A:
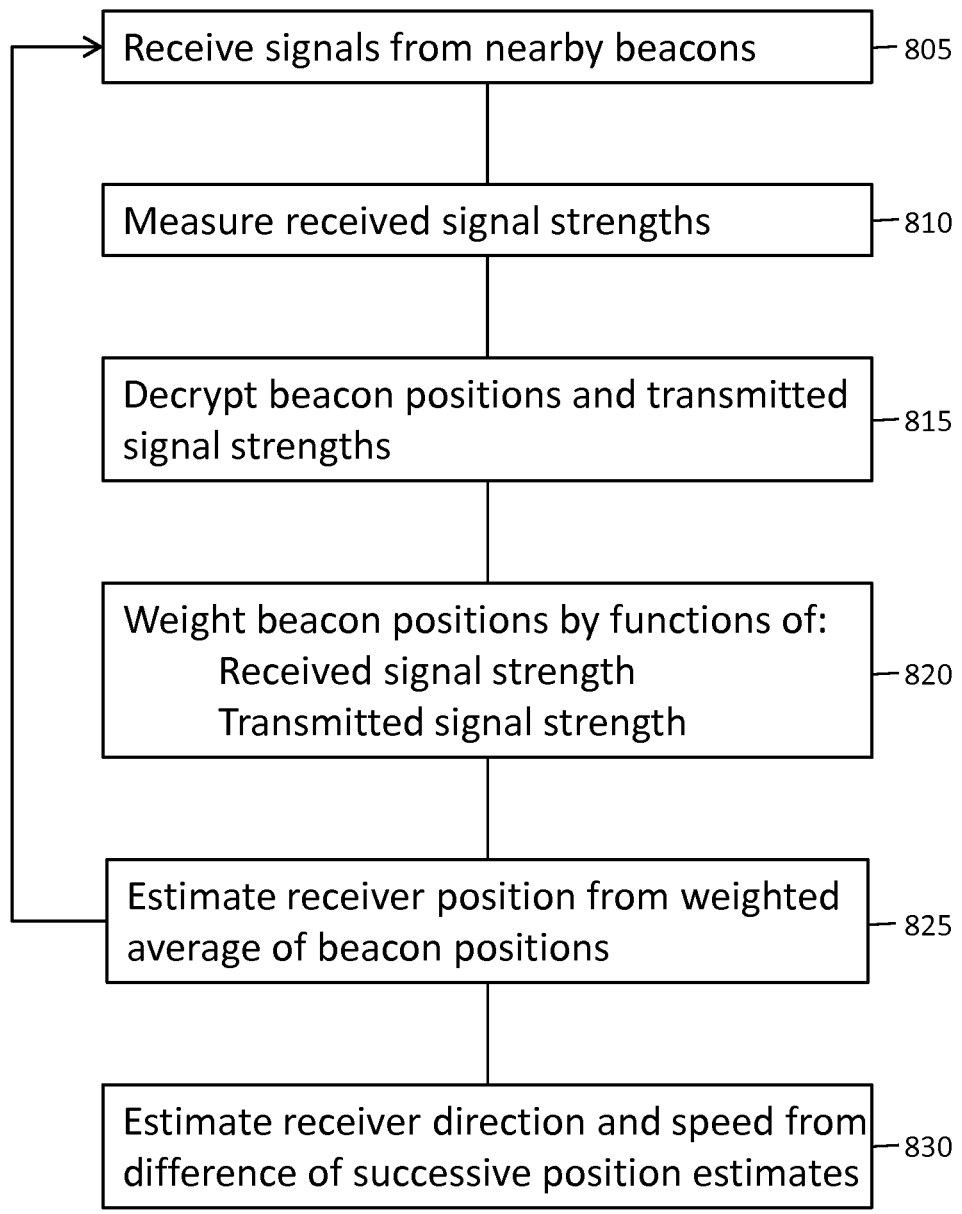
FIG. 8A is a flow chart for a low energy location beacon positioning method.

FIG. 8A is a flow chart for a low energy location beacon positioning method. In FIG. 8A, step 805 is receive signals from nearby beacons; step 810 is measure received signal strengths; step 815 is decrypt beacon positions and transmitted signal strengths; step 820 is weight beacon positions by functions of received and/or transmitted signal strengths; step 825 is estimate receiver position from weighted average of beacon positions; finally, step 830 is estimate receiver direction and speed from difference of successive position estimates. All of these steps may be performed by a cell phone equipped with a radio that can receive beacon transmissions. In the case of BLE this includes virtually all new cell phones. Cell phones may execute instructions stored in non-transitory computer readable media to perform position and speed estimating methods.

Not all of the steps in FIG. 8A are required and the order of steps may vary. For example, decryption of beacon positions and transmitted signal strengths is not necessary if that information is not encrypted in the first place. And, not all beacons send transmitted signal strength information.

A receiver may weight position reports that were transmitted at lower power levels more than those transmitted at higher power levels. For example, position may be estimated as $(x, y, z) = \{f(s_1)(x_1, y_1, z_1) + f(s_2)(x_2, y_2, z_2) + f(s_3)(x_3, y_3, z_3) + f(s_4)(x_4, y_4, z_4)\} / \{f(s_1) + f(s_2) + f(s_3) + f(s_4)\}$. Here $(x_n, y_n, z_n)$ is the position broadcast by beacon n and $f(s_n)$ is a function of the transmitted signal power $s_n$ of beacon n. Weighting function $f(s_n)$ may be $1/s^2$ or $1/e^s$ as examples. These functions cause positions broadcast at lower signal power to be more heavily weighted than those broadcast at higher signal power.

Similarly, a receiver may weight position reports according to received signal strengths. Weighting function $f(s_n)$ may be $s^2$ or $e^s$ as examples. These functions cause positions received with higher signal strength to be more heavily weighted than those received with lower signal strength. Alternatively, transmitted and/or received signal strength may be ignored; i.e. $f(s_n)=1$ leads to a simple average of received positions. Thus step 820 is optional.

An alternative to averaging is to find the median position broadcast by beacons within range. The median may be calculated as the middle most beacon, or the position defined by the middle most X coordinate, the middle most Y coordinate and the middle most Z coordinate. Another, even simpler method is to assume a receiver is at the position reported by a beacon. This estimate is almost never correct, but may still be useful in some applications. Those skilled in the art will appreciate that received positions from beacons may be combined in many different ways to arrive at receiver position estimates.

Estimating speed and direction of travel are optional but may be accomplished by comparing the position of a mobile receiver at different times. Speed may be obtained by dividing the distance between measured positions by the time between those positions, while direction may be estimated from vector difference of the positions.

FIG. 8A shows that step 805 may follow step 825, thus forming a loop. The time allotted for this loop is a receiver position update time that may be adjusted depending on a specific application. For example, in places where a high density of location beacons is available and speed and direction estimates are desired, the position update time may be shortened. Conversely, when the density of location beacons is low or speed and direction estimates are not needed, the position update time may be extended. An example of the latter situation is when a receiver wants to confirm presence in a room rather than estimate precise position in a room.

Figure 8B:
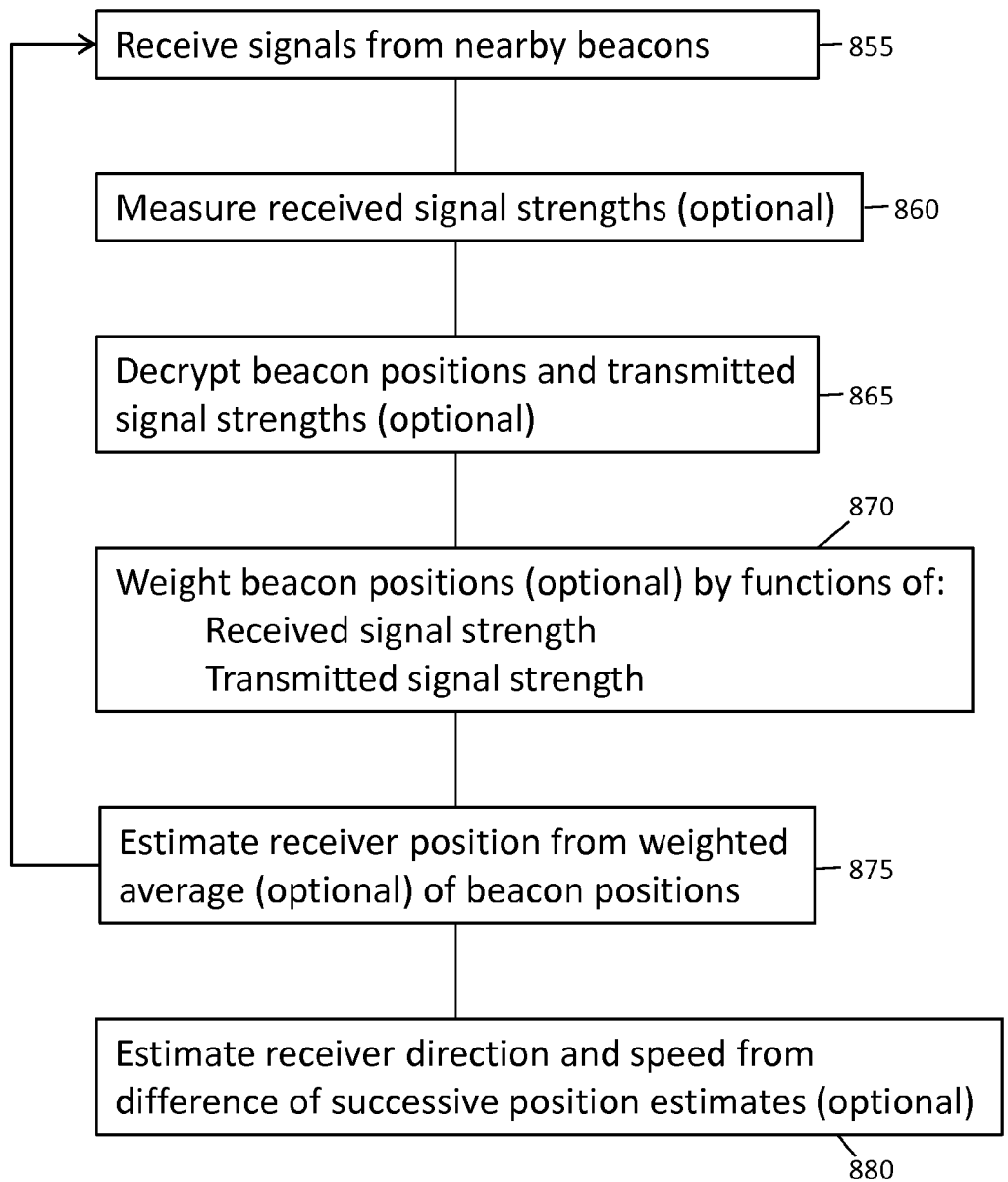
FIG. 8B is similar to FIG. 8A with some steps of the method labeled optional.

FIG. 8B is similar to FIG. 8A with some steps of the method labeled optional. In FIG. 8B steps 855 through 880 correspond to steps 805 through 830, respectively, of FIG. 8A. In FIG. 8B, however, all steps other than 855 are labeled optional for reasons mentioned above.

Low energy location beacons provide an infrastructure for indoor navigation that may be accessed by anyone with a cell phone or similar device having a radio receiver capable of receiving beacon transmissions.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A low energy location beacon comprising:
 a memory that stores:
  a fixed location of the beacon, the location expressed in a local coordinate system, and a location of a reference point of the local coordinate system expressed in a geo-coordinate system; and,
 a radio transmitter that is connected to an antenna, the transmitter periodically broadcasting the fixed location of the beacon and the location of the reference point that are stored in the memory, the transmitter using two or more different power levels in sequence and the transmitter further broadcasting the power level in use at any particular time.

2. The beacon of claim 1, the transmitter further broadcasting additional information stored in the memory.

3. The beacon of claim 1 further comprising a radio receiver for receiving position information and storing it in the memory.

4. The beacon of claim 1, the transmitter producing a radio frequency signal power of 0 dBm or less while transmitting.

5. The beacon of claim 1, broadcasts from the transmitter having a range of 50 m or less.

6. The beacon of claim 1, broadcasts from the transmitter being encrypted.

7. The beacon of claim 1, the transmitter broadcasting with a duty cycle less than 1%.

8. The beacon of claim 1 further comprising an electrical energy storage unit that supplies power to the transmitter.

9. The beacon of claim 8, the transmitter broadcasting with a duty cycle low enough to permit beacon operation for more than one year using power stored in the storage unit.

10. The beacon of claim 8, the electrical energy storage unit being a battery.

11. The beacon of claim 8, the electrical energy storage unit being a capacitor.

12. The beacon of claim 8 further comprising a photovoltaic cell to charge the electrical energy storage unit.

13. The beacon of claim 1, the transmitter operating in the 2.4 GHz band.

14. The beacon of claim 1, the transmitter operating in the 5.2 GHz band.

15. A non-transitory, computer-readable medium having instructions stored thereon that when executed by a microprocessor in a cell phone cause a method for estimating cell phone position to be performed, the method comprising:

receiving position broadcasts from one or more low energy location beacons located at fixed positions, each broadcast including the position of the beacon from which it was sent, the position of the beacon specified as a location expressed in a local coordinate system and a location of a reference point of the local coordinate system expressed in a geo-coordinate system, each broadcast being sent using two or more different power levels in sequence, each broadcast including the power level in use at any particular time, each broadcast having a transmitted signal strength, and each broadcast received with a received signal strength; and, performing a weighted average of received beacon positions to estimate cell phone position.

16. The medium of claim 15, weights in the weighted average being a function of received signal strength of the position broadcasts.

17. The medium of claim 15, weights in the weighted average being a function of transmitted signal strength of the position broadcasts.

18. The medium of claim 15, weights in the weighted average being a function of transmitted and received signal strengths of the position broadcasts.

19. The method of claim 15, the position broadcasts being encrypted, and further comprising decrypting the position broadcasts to learn beacon positions.

20. A non-transitory, computer-readable medium having instructions stored thereon that when executed by a microprocessor in a low energy location beacon cause a method for transmitting beacon position to be performed, the method comprising:

reading a fixed location of the beacon from a memory, the location expressed in a local coordinate system, and a location of a reference point of the local coordinate system expressed in a geo-coordinate system; and, using a radio transmitter that is connected to an antenna to periodically broadcast the fixed location of the beacon and the location of the reference point that are stored in the memory;

using two or more different transmitter power levels in sequence; and, broadcasting the power level in use at any particular time.

21. The medium of claim 20 further comprising:
broadcasting additional information stored in the memory.

* * * * *